(12) United States Patent
Koo

(10) Patent No.: US 8,180,212 B2
(45) Date of Patent: May 15, 2012

(54) OPTICAL SYSTEM FOR INFINITE IMAGE FORMATION AND METHOD FOR FABRICATING CAMERA MODULE USING THE SAME

(75) Inventor: Suk Yeong Koo, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 554 days.

(21) Appl. No.: 12/407,828

(22) Filed: Mar. 20, 2009

(65) Prior Publication Data
US 2009/0237629 A1    Sep. 24, 2009

(30) Foreign Application Priority Data

Mar. 20, 2008    (KR) .................... 10-2008-00025975

(51) Int. Cl.
*G03B 3/00* (2006.01)
*G03B 13/18* (2006.01)
*H04N 5/225* (2006.01)
*G02B 7/02* (2006.01)

(52) U.S. Cl. ....... 396/89; 396/529; 348/207.1; 348/340; 348/342; 348/345; 359/823

(58) Field of Classification Search ............. 396/89, 396/529; 348/207.1, 340, 345, 342; 359/642, 359/819, 823; 356/237.3; 353/100, 121, 353/122
See application file for complete search history.

(56) References Cited

U.S. PATENT DOCUMENTS
2005/0225877 A1* 10/2005 Tang .......................... 359/721
* cited by examiner

*Primary Examiner* — Rochelle-Ann J Blackman
(74) *Attorney, Agent, or Firm* — Saliwanchik, Lloyd & Eisenschenk

(57) ABSTRACT

Disclosed are an optical system for infinite image formation and a method for fabricating a camera module using the optical system. The optical system includes a first lens unit including at least one lens; a projection chart capable of partially allowing light to pass therethrough; a backlight unit capable of emitting light; and a first holder coupled with the first lens unit, the projection chart and the backlight unit. The first lens unit is exposed through an opening of the first holder. The method includes coupling the optical system with a camera module including a first lens unit, an image sensor and a printed circuit board, where the optical system is coupled to the first lens unit; and adjusting an effective focal length between the first lens unit and the image sensor by rotating the optical system and the first lens unit of the camera module.

15 Claims, 4 Drawing Sheets

OPTICAL SYSTEM FOR INFINITE IMAGE FORMATION AND METHOD FOR FABRICATING CAMERA MODULE USING THE SAME

CROSS-REFERENCE TO RELATED APPLICATION

The present application claims the benefit under 35 U.S.C. §119 of Korean Patent Application No. 10-2008-0025975, filed Mar. 20, 2008, which is hereby incorporated by reference in its entirety.

BACKGROUND

With the development of a cell phone equipped with a camera, still images and dynamic images can be photographed using the cell phone. At the present time, performance of a camera has been gradually improved to take a photograph of high quality images of high resolution.

Such a camera includes a plurality of lenses and shifts the lenses to vary a relative distance therebetween, thereby adjusting an optical focal distance thereof.

BRIEF SUMMARY

Embodiments provide an optical system for infinite image formation and a method for fabricating a camera module using the same.

An optical system for infinite image formation according to an embodiment includes a first lens unit including at least one lens; a projection chart capable of partially allowing light to pass therethrough; a backlight unit capable of emitting light; and a first holder coupled with the first lens unit, the projection chart and the backlight unit. The first lens unit, the projection chart and the backlight unit are sequentially disposed and the first lens unit is exposed through an opening of the first holder.

A method for fabricating a camera module using an optical system for infinite image formation according to another embodiment includes the steps of preparing an optical system for infinite image formation to form an image at an infinite length, coupling the optical system with a camera module including a first lens unit, an image sensor and a printed circuit board, and adjusting an effective focal length between the first lens unit and the image sensor by rotating the optical system and the first lens unit of the camera module. The camera module performs an auto-focusing function and the optical system is coupled with the first lens unit of the camera module.

DETAILED DESCRIPTION

Hereinafter, an optical system for infinite image formation and a method for fabricating a camera module using the same according to an embodiment will be described in detail with reference to the accompanying drawings.

Figure 1:
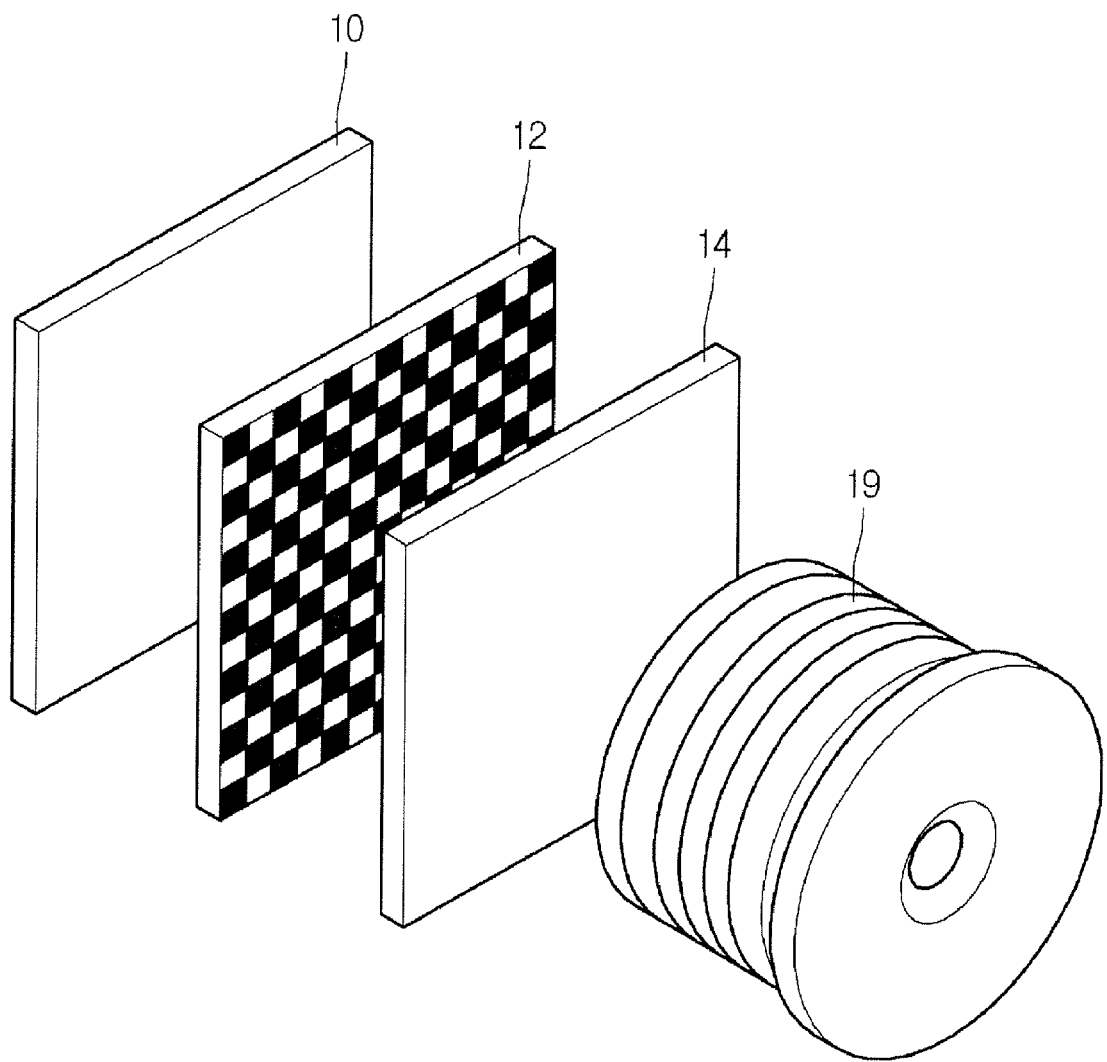
FIG. 1 is a perspective view showing elements of an optical system for infinite image formation and FIG. 2 is a side-sectional view showing an optical system for infinite image formation.
Figure 2:
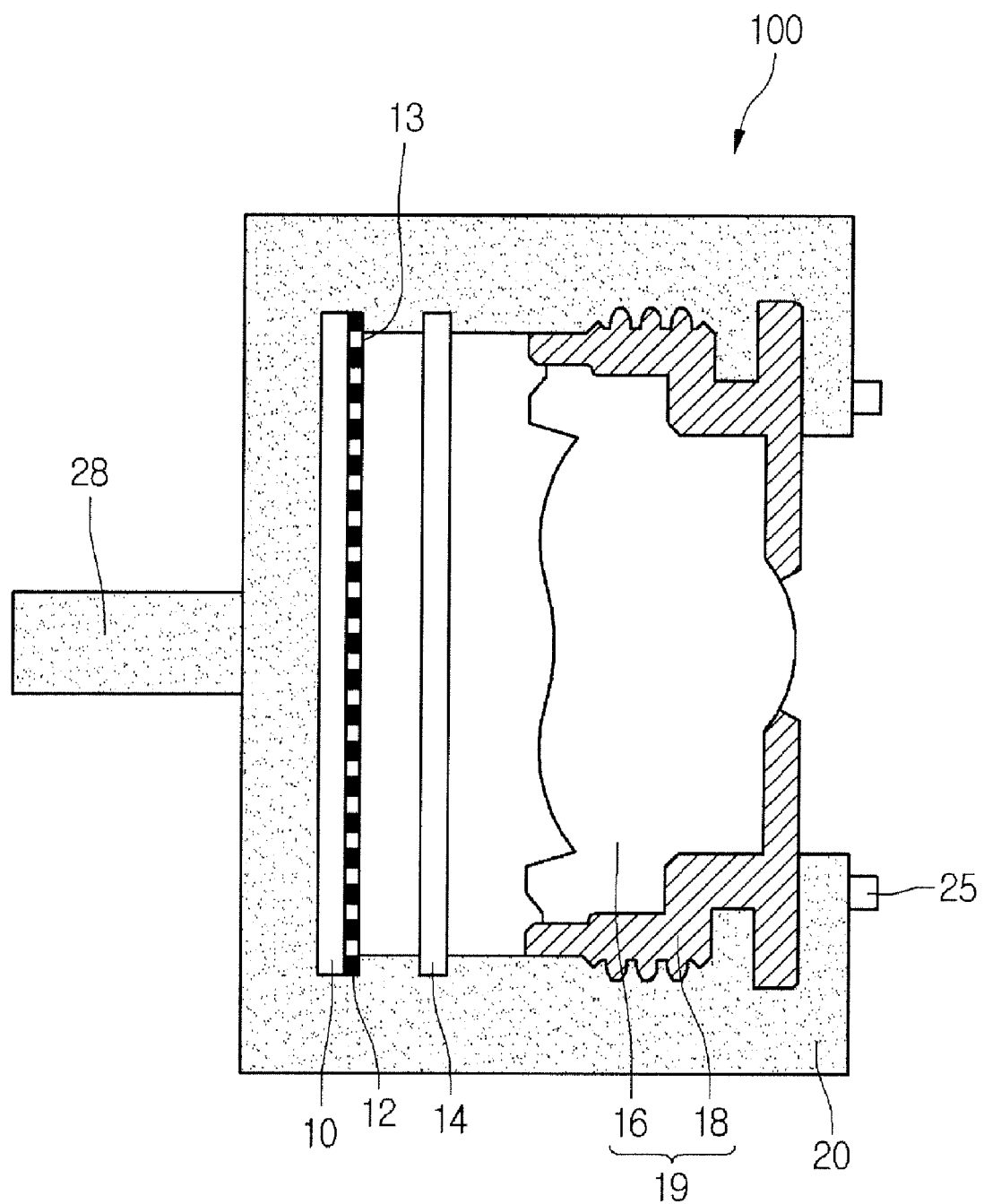

FIG. 1 is a perspective view showing elements of the optical system for infinite image formation and FIG. 2 is a side-sectional view showing the optical system for infinite image formation.

Figure 3:
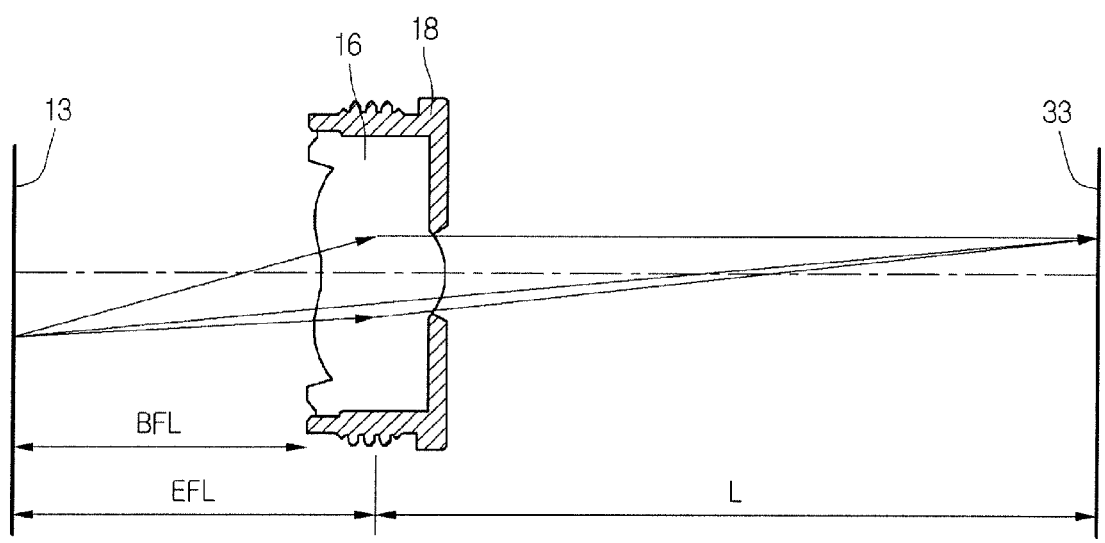
FIG. 3 is a view showing a route for forming an image at an infinite length through an optical system for infinite image formation.
Figure 4:
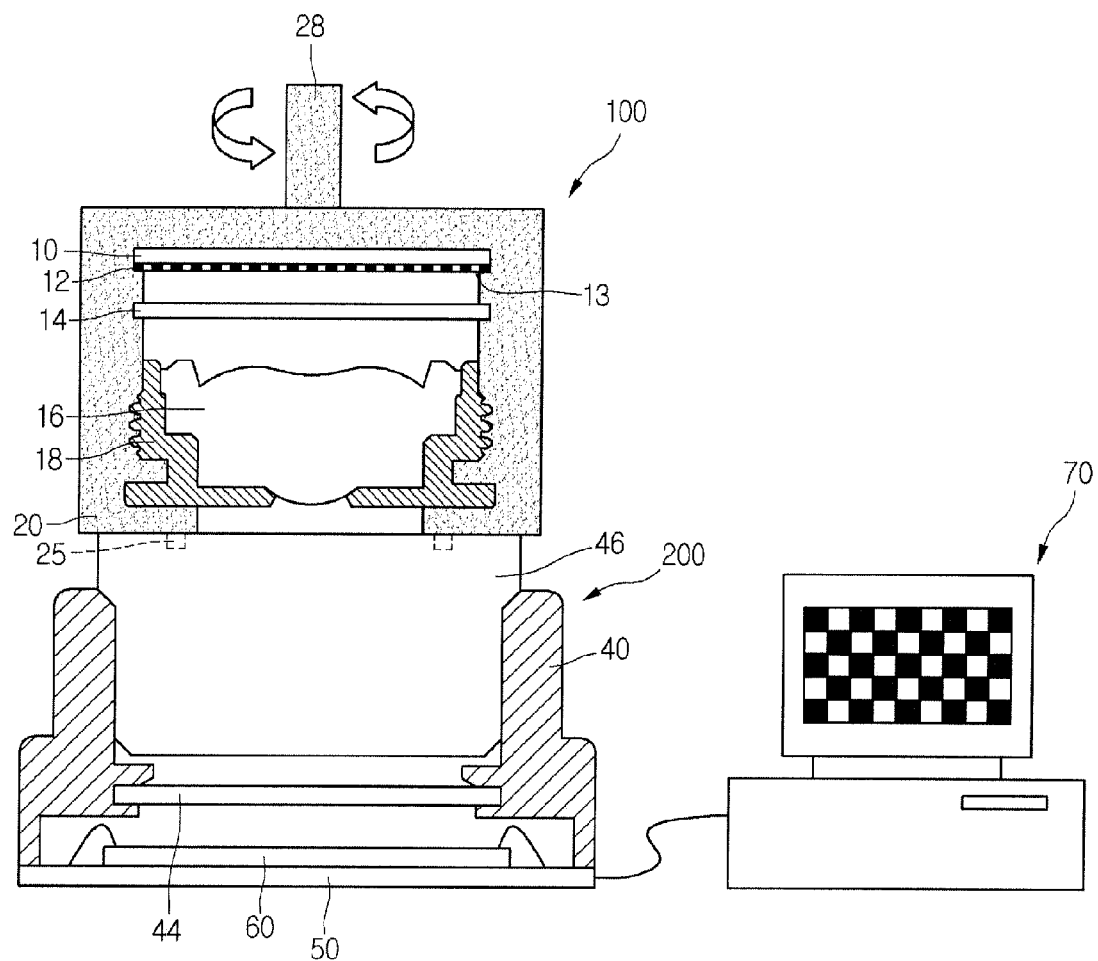
FIG. 4 is a side-sectional view showing a state in which an optical system for infinite image formation is coupled with a camera module.

FIG. 3 is a view showing a route for forming an image at an infinite length through the optical system for infinite image formation, and FIG. 4 is a side-sectional view showing a state in which the optical system for infinite image formation is coupled with a camera module.

As shown in FIGS. 1 and 2, the optical system 100 according to an embodiment includes a first holder 20 provided with a backlight unit 10, a projection chart 12, a first infrared ray (IR) blocking filter 14 and a first lens unit 19.

The first holder 20 has an opening formed in one surface thereof. The backlight unit 10, the projection chart 12, the first IR blocking filter 14 and the first lens unit 19 are sequentially disposed in the first holder 20.

In detail, the backlight unit 10 and the projection chart 12 are disposed at the innermost side of the first holder 20, and the first lens unit 19 can be exposed through the opening of the first holder 20.

Further, the first IR blocking filter 14 is disposed between the first lens unit 19 and the projection chart 12.

The backlight unit 10 can emit light using a light emitting diode (LED) backlight panel.

The projection chart 12 may have patterns capable of allowing light to pass therethrough and blocking the light.

When an image for the patterns of the projection chart 12 is formed outside after the light emitted from the backlight unit 10 passes through the projection chart 12, the patterns are used to achieve exact focusing of the optical system 100. The patterns may include various patterns.

The first lens unit 19 includes a first lens 16 having at least one lens and a lens barrel 18 capable of fixing the first lens 16.

The first lens 16 is assembled to the lens barrel 18 such that optical axes of the lenses match with each other.

The light emitted from the backlight unit 10 passes through the first IR blocking Filter 14 and the first lens 16 via the projection chart 12, so that the image for the patterns of the projection chart 12 can be formed outside.

At this time, a first effective focal length (EFL) can be maintained between a first surface 13 of the projection chart 12 and the center of the first lens 16, and a back focal length (BFL) can be maintained between the first surface 13 of the projection chart 12 and the front end of the first lens 16.

The first effective focal length is maintained between the projection chart 12 and the first lens 16, so that the image of the projection chart 12 formed at the outside of the optical system 100 can be clearly formed regardless of distance.

This is based on the principle in which, when the distance between the center of a lens (optical system) and an image sensor is maintained within the first effective focal length in the camera module, an image of an object existing at an infinite length is clearly formed on the image sensor.

In detail, if the projection chart 12 is disposed (instead of the image sensor) such that the distance between the projection chart 12 and the center of the first lens 16 (optical system) is maintained within the first effective focal length, the image of the projection chart 12, which is formed at the outside of the optical system 100, can be clearly formed at the infinite length L.

Further, at least one protrusion 25 is formed around the opening of the first holder 20, and at least one rotary member 28 is formed on a rear surface of the first holder 20, which is opposite to a surface having the protrusion 25, to rotate the optical system 100.

The protrusion 25 is used to couple the optical system 100 with the camera module. After the optical system 100 is coupled with the cameral module, the optical system 100 can be rotated using the rotary member 28.

FIG. 4 is a side-sectional view showing a state in which the optical system for infinite image formation is coupled with the camera module.

The camera module 200 coupled with the optical system 100 includes a second lens unit 46, a second holder 40, a second IR blocking filter 44, an image sensor 60 and a printed circuit board 50 to perform auto focusing.

Although not Shown in FIG. 4, the second lens unit 46 may include at least one lens and a lens barrel capable of fixing the lens.

The second lens unit 46 may include a driving source capable of controlling a focus by adjusting a position of the lens, and allowing auto-focusing and optical zooming functions to be performed. Further, the second lens unit 46 can be formed at an upper end thereof with at least one groove into which the protrusion 25 of the optical system 100 is inserted.

The second lens unit 46, the second IR blocking filter 44, and the printed circuit board 50 are coupled with the second holder 40; and the second IR blocking filter 44 and the printed circuit board 50 are sequentially disposed below the second lens unit 46.

The printed circuit board 50 includes the image sensor 60, which converts an optical signal into an electric signal, and has a circuit pattern that processes a signal processed by the image sensor 60. The printed circuit board 50 is positioned under the second holder 40.

Further, the printed circuit board 50 can be connected with a display apparatus 70 such as a monitor.

The image generated from the optical system 100 is input to the second lens unit 46 and a signal is generated from the image sensor 60, so that an image of the image sensor 60 can be displayed on the display apparatus 70 connected with the printed circuit board 50.

The protrusion 25 formed on the first holder 20 of the optical system 100 is inserted into the groove of the second lens unit 46 of the camera module 200, so that the optical system 100 can be coupled with the camera module 200.

In detail, the opening of the optical system 100 is coupled with the second lens unit 46 of the camera module 200 to face each other, so that images generated from the optical system 100 can be input to the second lens unit 46.

After the optical system 100 is coupled with the camera module 200, the optical system 100 and the second lens unit 46 can be rotated by rotating the rotary member 28 formed on the optical system 100.

As the optical system 100 and the second lens unit 46 are rotated using the rotary member 28, the lens of the second lens unit 46 can be shifted up and down.

The lens of the second lens unit 46 is shifted up and down, so that a second effective focal length of the camera module 200 can be adjusted.

The second effective focal length can be adjusted by shifting the lens toward the optical system 100 until the image displayed on the display apparatus 70 becomes clear.

An infinite image is provided to the camera module 200 using the optical system 100, so that an error can be inhibited when focusing is performed through the object. Thus, defocusing and miss-focusing can be inhibited and focusing can be performed exactly and precisely.

Further, since it is not necessary to perform the focusing by arranging the object within a length similar to an infinite length, a large space is not necessary and the process scale can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical system for infinite image formation comprising:
    a first lens unit including at least one lens;
    a projection chart for partially allowing light to pass therethrough;
    a backlight unit for emitting light; and
    a first holder coupled with the first lens unit, the projection chart and the backlight unit,
    wherein the first lens unit, the projection chart and the backlight unit are sequentially disposed and the first lens unit is exposed through an opening of the first holder.

2. The optical system as claimed in claim 1, further comprising at least one protrusion formed at a surface of the first holder, the surface being at an end of the first holder in which the first lens unit is exposed through the surface of the first holder.

3. The optical system as claimed in claim 1, further comprising at least one rotary member formed on a rear surface of the first holder, which is opposite to a surface having the opening.

4. The optical system as claimed in claim 1, wherein the backlight unit comprises a light emitting diode.

5. The optical system as claimed in claim 1, wherein the projection chart is disposed between the backlight unit and the first lens unit, and the projection chart is spaced apart from the first lens unit by a back focal length.

6. The optical system as claimed in claim 1, further comprising an infrared ray filter between the first lens unit and the projection chart.

7. A method for fabricating a camera module using an optical system for infinite image formation, the method comprising:
    preparing an optical system for infinite image formation to form an image at an infinite length;
    coupling the optical system with a camera module, the camera module comprising a first lens unit, an image sensor and a printed circuit board; and adjusting an effective focal length between the first lens unit and the image sensor by rotating the optical system and the first lens unit of the camera module,
wherein the camera module performs an auto-focusing function and wherein the optical system is coupled with the first lens unit of the camera module;
wherein the optical system comprises:
a second lens unit including at least one lens;
a projection chart for partially allowing light to pass therethrough;
a backlight unit for emitting light; and
a first holder coupled with the second lens unit, the projection chart and the backlight unit.

8. The method as claimed in claim 7, wherein the second lens unit, the projection chart and the backlight unit are sequentially disposed, and wherein the second lens unit is exposed through an opening of the first holder.

9. The method as claimed in claim 8, wherein the optical system further comprises at least one protrusion, and wherein the first lens unit of the camera module is formed with at least one groove.

10. The method as claimed in claim 9, wherein the coupling of the optical system with the camera module comprises inserting the protrusion of the optical system into the groove of the first lens unit, wherein after inserting the protrusion of the optical system into the groove of the first lens unit the first lens unit is rotated by the rotating of the optical system.

11. The method as claimed in claim 9, wherein the protrusion is formed at one end of the first holder in which the second lens unit is exposed.

12. The method as claimed in claim 8, wherein the optical system further comprises at least one rotary member on a rear surface of the first holder, which is opposite to a surface having the opening.

13. The method as claimed in claim 7, wherein the light emitted from the backlight unit is used to form an image at the infinite length through the projection chart and the second lens unit.

14. The method as claimed in claim 7, wherein, when the effective focal length between the first lens unit and the image sensor is adjusted by rotating the optical system and the first lens unit of the cameral module, focusing of the camera module is controlled through a display apparatus connected with the printed circuit board of the camera module.

15. The method as claimed in claim 7, wherein adjusting the effective focal length between the first lens unit and the image sensor comprises rotating the optical system and the first lens unit such that a lens of the first lens unit is shifted.

* * * * *